(No Model.)
M. KELLY.
BARBED WIRE FENCE.
No. 322,108. Patented July 14, 1885.
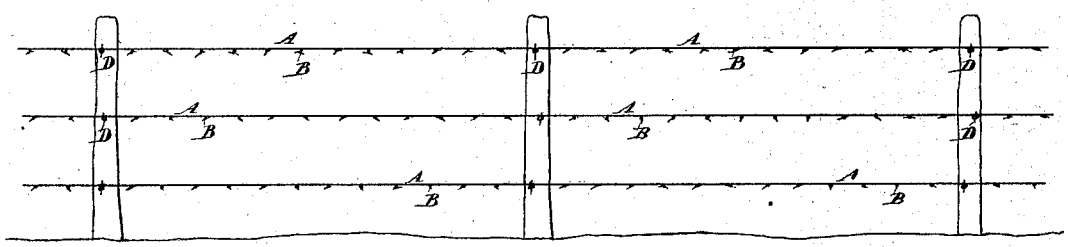
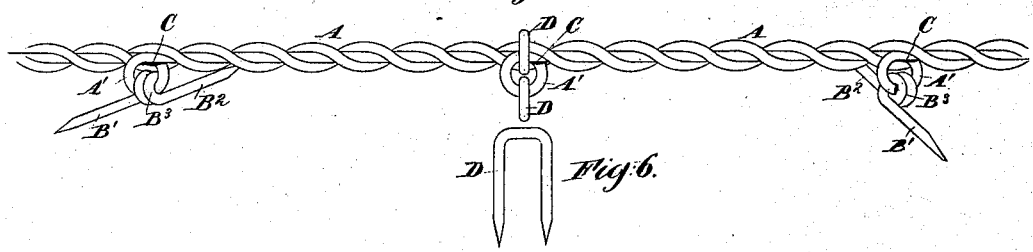
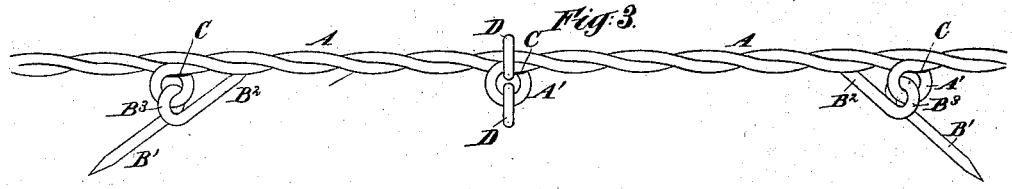
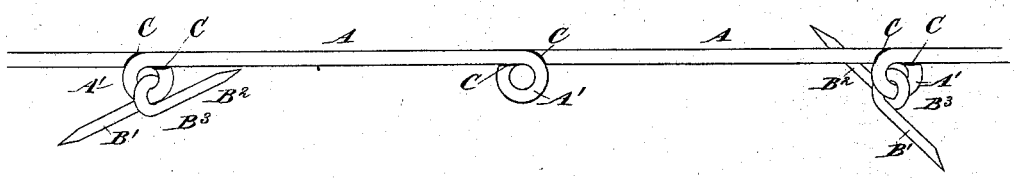
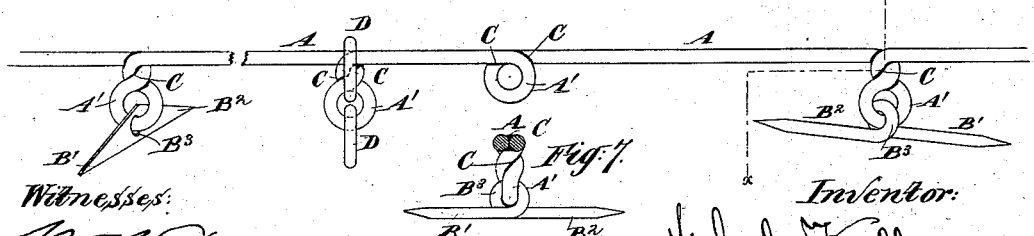
Witnesses:
Inventor:

UNITED STATES PATENT OFFICE.

MICHAEL KELLY, OF NEW YORK, N. Y., ASSIGNOR OF ONE-HALF TO THOMAS ROSEVEAR, OF SAME PLACE.

BARBED-WIRE FENCE.

SPECIFICATION forming part of Letters Patent No. 322,108, dated July 14, 1885.

Application filed January 7, 1885. (No model.)

*To all whom it may concern:*

Be it known that I, MICHAEL KELLY, of New York city, in the county and State of New York, have invented certain new and useful Improvements in Barbed-Wire Fences, of which the following is a specification.

I have devised and reduced to practice a mode of construction by which the barbs are effective in pricking the cattle and perform the useful functions required of them without the risk of serious injury to the cattle which attends the use of ordinary rigidly-set barbs. I mount the barbs so that they are at liberty to turn to one side or the other. The parts are so constructed and proportioned that gravity holds them in the proper effective position until they are struck by the animal, when after pricking and retreating they return instantly to the defensive position. I can use wires of about the ordinary size, either single, double, or triple, as the main wire or stringer. There may be two or any other number of the stringers with their peculiarly constructed and attached barbs. The barbs may be of wire of the same or different size. I can, if preferred, make the barbs of sheet metal, cut into the proper form and punched. I provide loops the proper distance apart in the main wire. These loops determine the places of the several barbs. I propose to designate my fence as the "Wabbling Barb" fence.

The accompanying drawings form a part of this specification, and represent what I consider the best means of carrying out the invention.

Figure 1 is a side elevation showing the entire fence with three lines of stringers, all constructed according to my invention. Fig. 2 is an elevation showing the stringer as constructed with three wires, the loops (for receiving the barbs and for receiving the staples which confine it to the post, not represented) being formed in one wire, which is not twisted, and the other two wires being without loops and twisted in the ordinary manner of wire ropes and wire-fence stringers. Fig. 3 is a side elevation. Fig. 4 is a side elevation showing the stringer as made with a single wire. Fig. 5 shows another stringer with a single wire. Fig. 6 shows a staple detached. Fig. 7 is a cross-section on the line $x\ x$ in Fig. 5.

Similar letters of reference indicate corresponding parts in all the figures where they occur.

Referring to Fig. 5, A is the main wire and A' is the loop which serves as one member of the hinge or wabbling connection with the barb B. Certain portions of the latter will be designated when necessary by additional marks, as B'. Each barb has two equal arms, as B' B², and a central loop, B³. Where two or more wires are employed in the main stringer A, the loops A' may be formed in one wire alone.

In Fig. 3 there are two wires in the stringer A. In Fig. 2 there are three wires therein.

Fig. 4 shows the loop A' joined to the corresponding main wire without any twist. Fig. 5 shows these parts as twisted together.

Solder may be applied by hand or machinery, to strongly unite the metal at each connection, and thus contribute to the strength of the fence.

C represents solder so applied.

Fig. 5 shows one barb made of sheet metal.

When two or more wires are in the stringer A, they may be twisted together, as shown. The loop may for most purposes be made somewhat larger than is necessary, and twisted half around or quite around. The solder C gets a firm hold in such case. It is important that the loop A' be left sufficiently large and unencumbered with solder to allow the barb to wabble. When the loops A' in the main wire are formed by the turn from right to left, the loops B³ in the barb should be formed by a turn from left to right. This insures that the barbs always tend to hang with their points presented substantially level and at right angles to the plane of the main stringer A.

D D are staples for attaching the stringers to the post. One leg of each is inserted in one of the loops A.' They hold the wire against twisting around or revolving.

Various modifications may be made without departing from the principle or sacrificing the advantages of the invention. I can make two turns or convolutions of the wire B' B², which constitutes the barb. In such case it will be understood that there are two coils or convolutions in the wire B³, each extending through the loop A' in the stringer or main wire, as shown in Fig. 2. The wire may be iron or steel.

When, in use, any animal comes in contact with the fence, the wabbling barbs B stand in such positions that their points are presented to the animal, and are sure to prick; and if the animal persists in pressing against the fence it will be repeatedly pricked, but if the animal moves laterally to one side or the other, instead of tearing the skin, as is the case with rigidly-connected barbs, my barbs turn easily around on their jointed or wabbling connections with the loops A' of the stringer A and the mischief is averted. The pricking occurs immediately on the animal's coming in either oblique or direct contact with the point of the barb, and so impacting the line-wire by the barb. The cattle are sufficiently pricked on approaching my fence to compel their respect for it. The barbs prick so as to be effective for good without risk of ever tearing the animal and becoming effective for evil.

What I have termed "solder" may be tin or any alloy of metal which fuses at a lower temperature than the main wire A.

All the wires may be coated with zinc, tin, or other protective covering.

When, from high wind or other cause, a fence becomes considerably inclined to one side or the other, gravity acting on my barbs holds them as before, each with its points $B'$ $B^2$ substantially level and ready to prick any animal that approaches.

Machinery for manufacturing some or all of the varieties may be made the subject of a separate application for patent.

The barbs when made of wire may be strengthened by solder or its equivalent applied in the loops.

The construction of the hinge formed by the engagement of the barbed loop A' of the stringer not only allows the barb to wabble freely in the plane transverse to the stringer, but also to change the plane within wide limits.

Practically my barbs can wabble freely in all directions while remaining strongly attached.

I claim as my invention—

1. The barbed fence-wire comprising a main stringer provided with dependent loops A', in combination with barbs loosely mounted in said loops and adapted to turn and wabble freely in all directions, as herein specified.

2. The barbed wire-fence described, consisting of a stringer having dependent loops A', strengthened by solder, and wabbling barbs mounted in said loops, substantially as herein specified.

In testimony whereof I have hereunto set my hand at New York city, N. Y., this 23d day of December, 1884, in the presence of two subscribing witnesses.

MICHAEL KELLY.

Witnesses:
CHARLES R. SEARLE,
W. C. DEY.